May 21, 1935.  P. PETERSON  2,002,097

METHOD AND APPARATUS FOR MAKING SHEET METAL ARTICLES

Filed Dec. 21, 1931   8 Sheets-Sheet 1

Inventor
Peter Peterson
By Walker and Sylvia
Attorneys

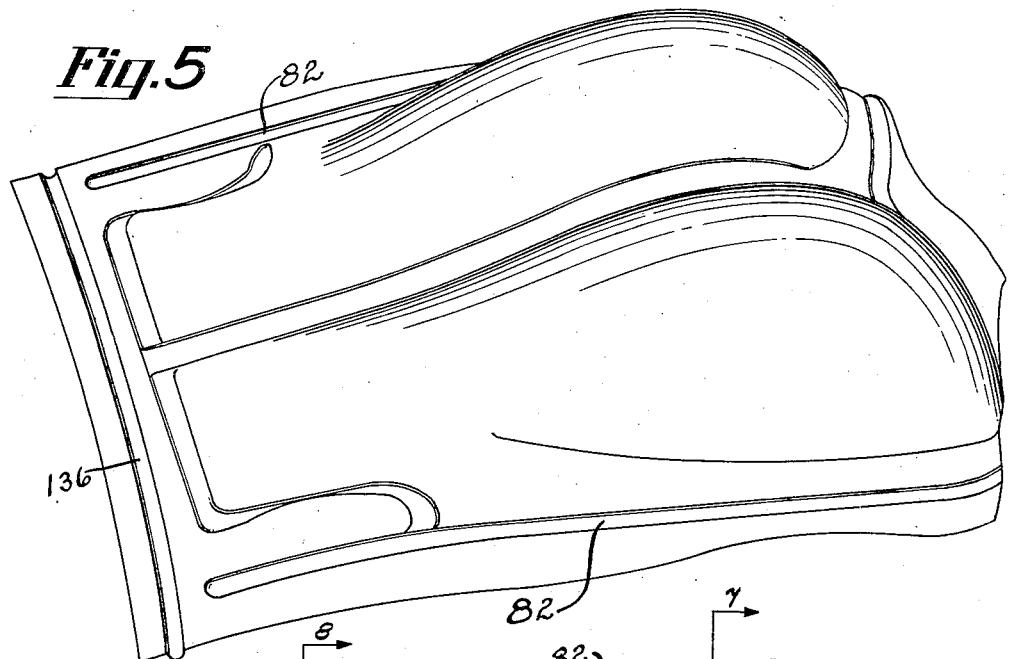
Fig.5
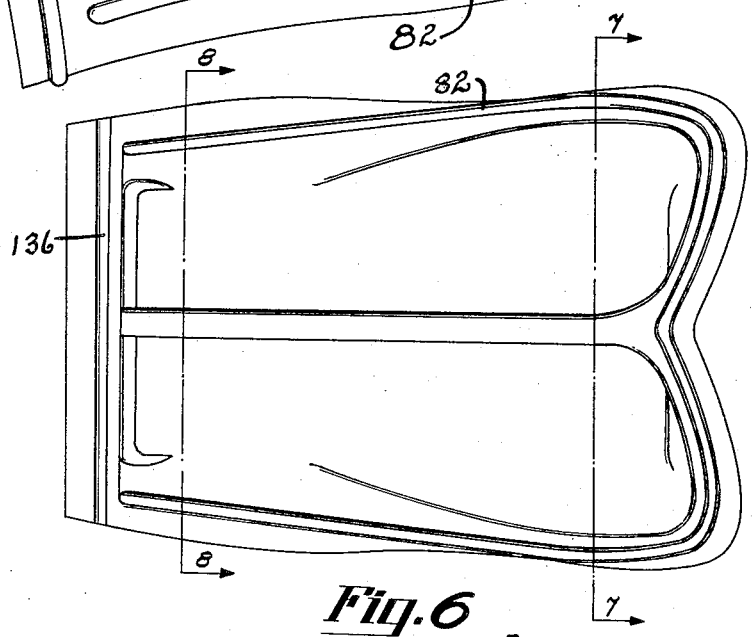
Fig.6
Fig.8
Fig.7

May 21, 1935.　　　　P. PETERSON　　　　2,002,097
METHOD AND APPARATUS FOR MAKING SHEET METAL ARTICLES
Filed Dec. 21, 1931　　　8 Sheets-Sheet 3

Inventor
Peter Peterson
By Walker and Dybvig
Attorneys

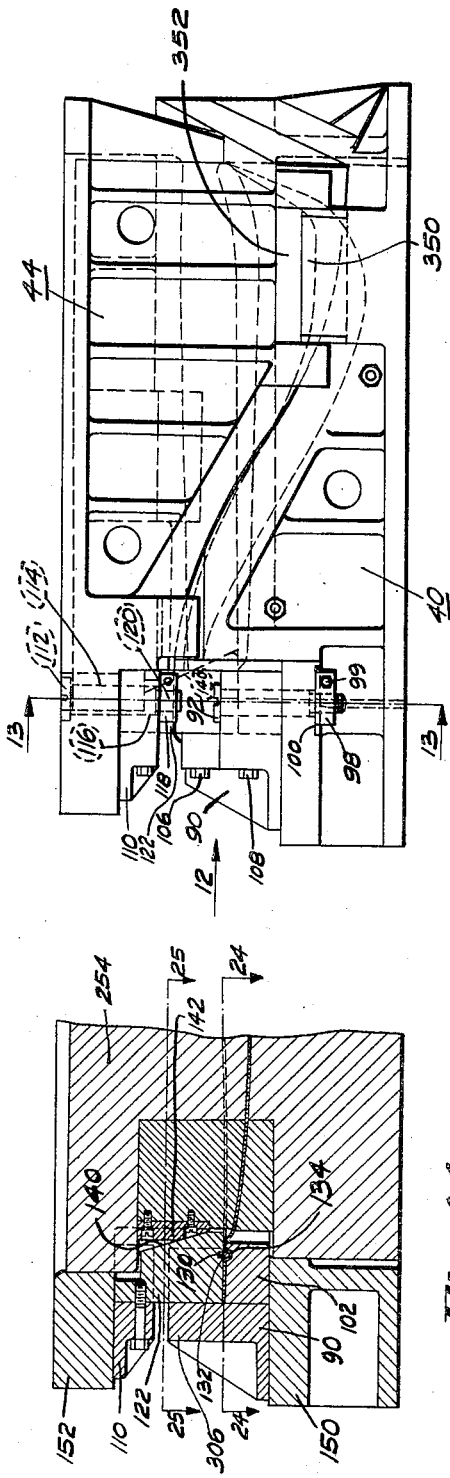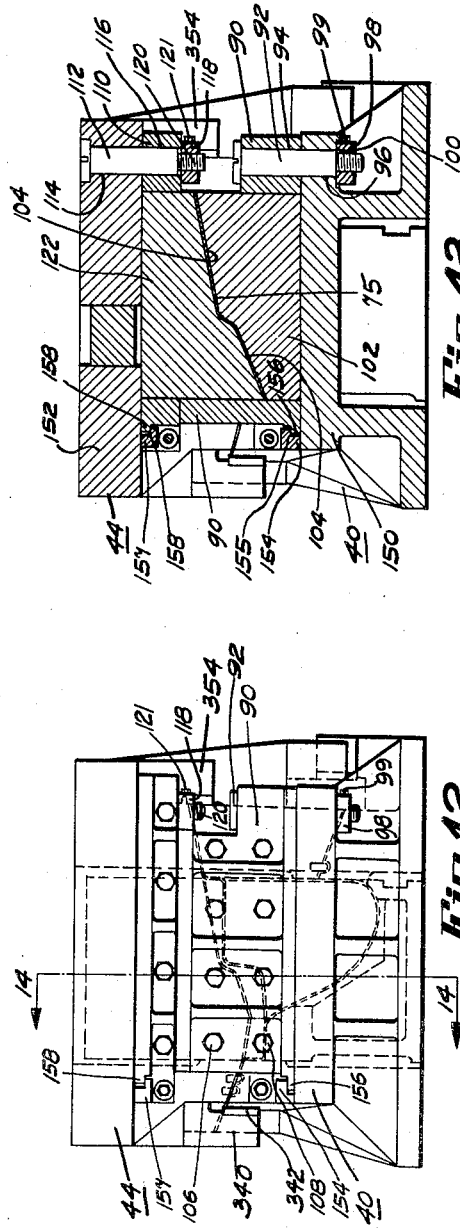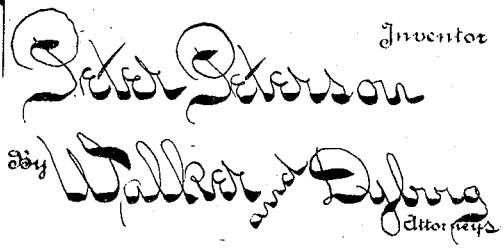

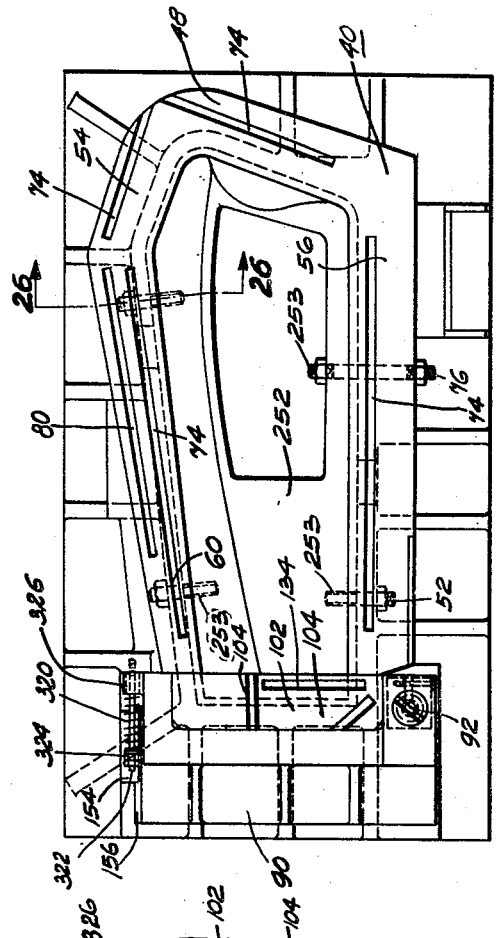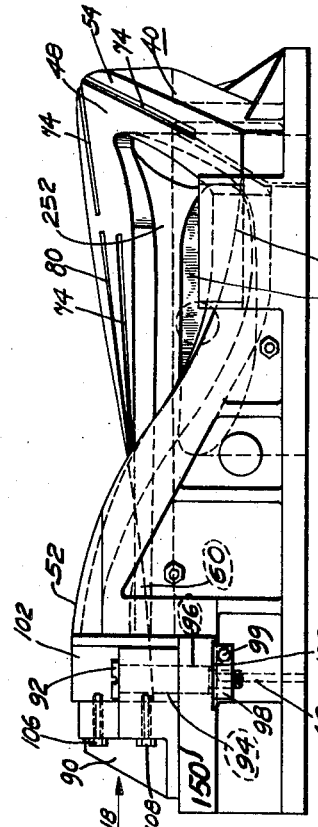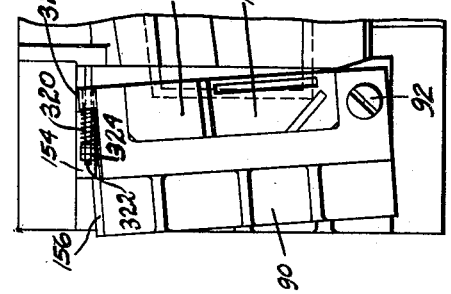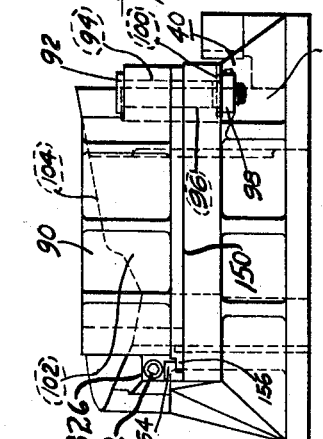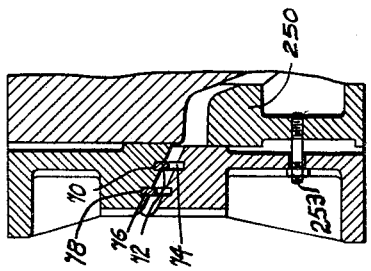

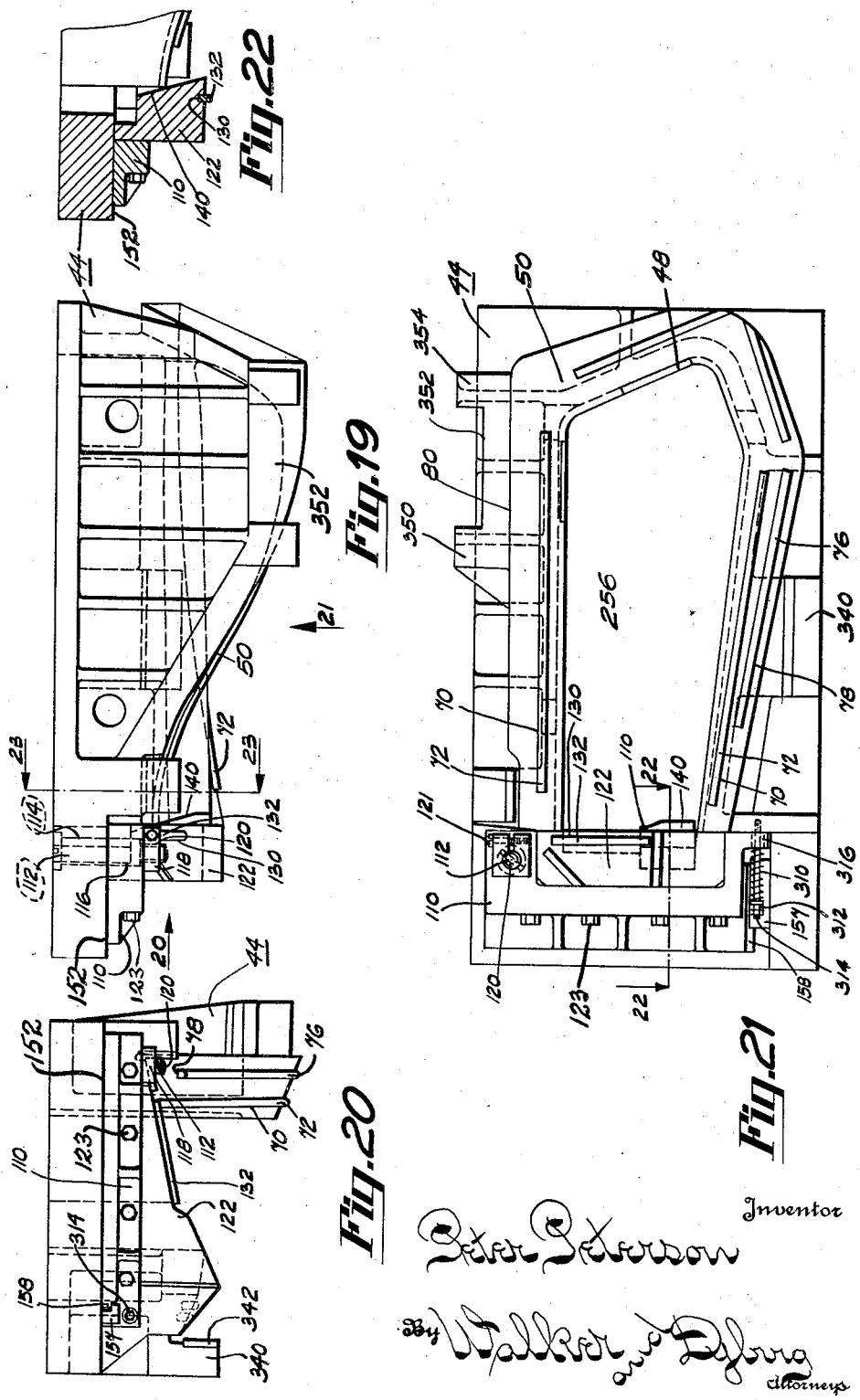

May 21, 1935. P. PETERSON 2,002,097
METHOD AND APPARATUS FOR MAKING SHEET METAL ARTICLES
Filed Dec. 21, 1931 8 Sheets-Sheet 7
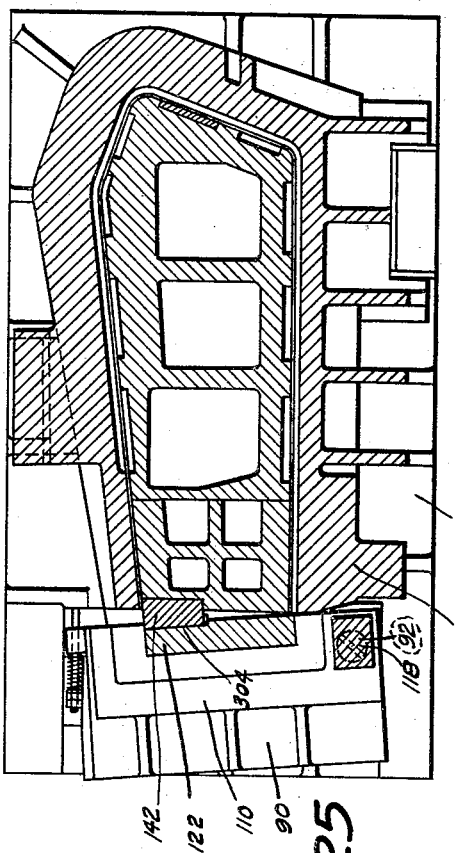
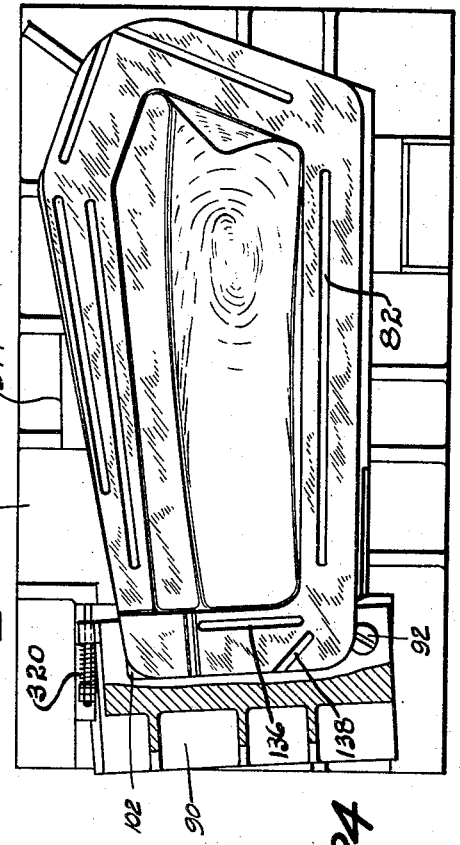
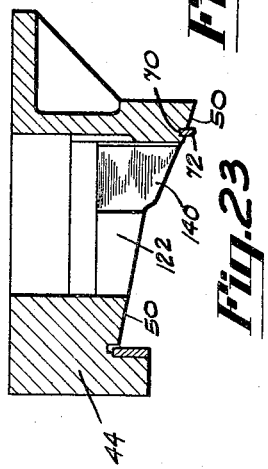
Inventor
Peter Peterson
by Walker and Dyking
Attorney

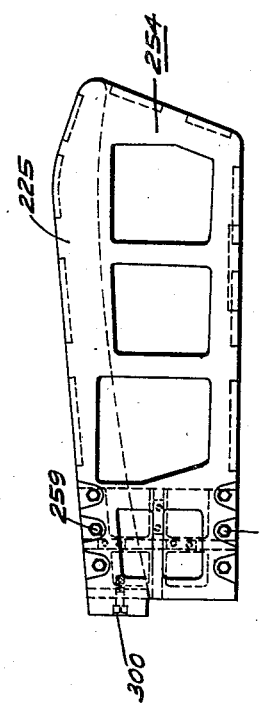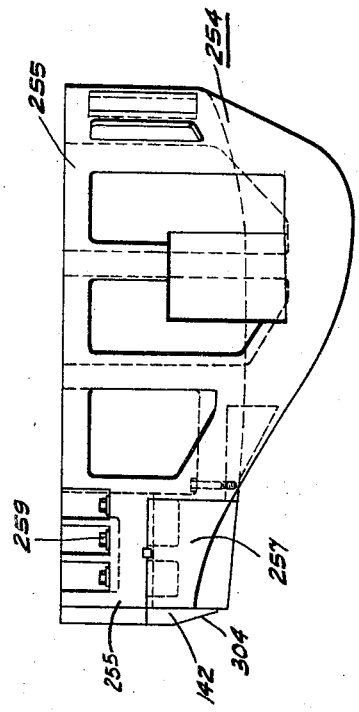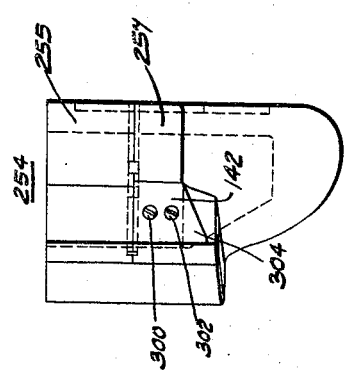

Patented May 21, 1935

2,002,097

UNITED STATES PATENT OFFICE 2,002,097

METHOD AND APPARATUS FOR MAKING SHEET METAL ARTICLES

Peter Peterson, Toledo, Ohio, assignor to The City Auto Stamping Company, Toledo, Ohio, a corporation of Ohio Application December 21, 1931, Serial No. 582,397

31 Claims. (Cl. 113—46)

This invention relates to a method of an apparatus for forming sheet metal from blanks and in particular to the disposition of excess material so that the finished product has a smooth surface without undesirable wrinkles.

In the process of forming articles from sheet metal by drawing or stamping, there is a tendency at times, depending upon the shape of the blank, the thickness and quality of metal, to wrinkle so that the finished product is not smooth. The wrinkles tend to form wherever there is a flow of the metal towards one particular area or areas, that is, slight waves of ripples probably travel in advance of the former until it meets resistance or encounters a like ripple traveling in the reverse direction so that the wrinkle is formed in the finished article. An example of such difficulty is found in the formation of parts for automobiles, such as fenders, in which the present style requires a portion of the chassis-housing to be formed integral with the body of the fender and necessitates the displacement of closely adjacent portions of material in several directions. This results in a group of wrinkles which must be ironed out usually manually or scraped or filled with solder to render the product useable.

In the past it has been customary in sheet metal stamping and drawing operations to supply additional metal to the die during the forming operation. By my method of eliminating wrinkles in the finished product, this operation is reversed in that a portion of the sheet metal is placed under pulling tension that may be increased during the forming operation so that a sufficient quantity of the material is withdrawn from the die in opposition to the forming pressure of the forming die so as to take up this slack or excess material displaced by the former, thereby maintaining the material under tension in advance of the operating area of the former and leaving no material available for the formation of the objectional wrinkles. This is preferably affected by means of a movable blank holder operated in unison with the movement of the forming die thereby drawing material out of the matrix in opposition to the pressure of the former as the latter forms the material.

An object of this invention is to remove a portion of the material during the forming operation so as to have a finished article that is free from undesirable wrinkles. This has been accomplished by gradually removing a portion of the material during the forming operation.

Another object of this invention is to supply additional material to a portion of the forming die and withdrawing material from another portion of the forming die. This has been accomplished by clamping a portion of the stock work sheet in clamping members that permit slippage so that as tension is supplied to the blank by the forming die operating thereon, the material is permitted to flow into the die and by clamping another portion of the work blank in movable clamping members so constructed and arranged as to move away from the forming die during the forming operation, so as to remove material from the forming die.

Another object of this invention is to provide a pair of movable clamping members so constructed and arranged that as the clamping members are moved during the clamping of the material, an additional force is applied thereto so as to prevent slippage of the material.

Another object of the invention is to provide means for moving the forming die and the clamping members simultaneously so as the material is forming, a portion of the material is moved out from the forming dies. This has been accomplished by providing a cam carried by the forming member that engages the clamping members so as to actuate the clamping members away from the forming dies.

A further object of the invention is to provide an improved process and an improved apparatus for producing an irregularly shaped sheet material article.

Another object is to decrease the cost of forming metal. This has been accomplished by forming the metal in one operation so that no further forming by manual labor is required.

Further objects and advantages of the present invention will be apparent from the following description, reference being had to the accompanying drawings wherein a preferred embodiment of one form of the present invention is clearly shown.

In the drawings:

Fig. 1 discloses a conventional fender made by the old process.

Fig. 2 discloses a fender as seen from below made by the process disclosed in this application.

Fig. 5 discloses a pair of fenders drawn from the same sheet of material before being severed.

Fig. 6 discloses a pair of fenders from below drawn to reduced scale from the disclosure of Fig. 5.

Fig. 7 and Fig. 8 disclose sectional views taken on line 7—7 and line 8—8 of Fig. 6 respectively.

Figure 2:
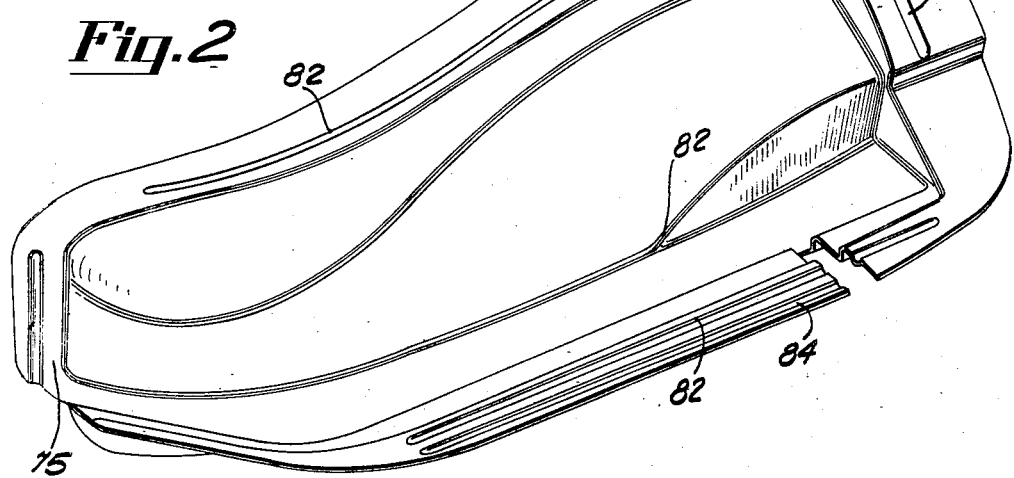
Figure 3:
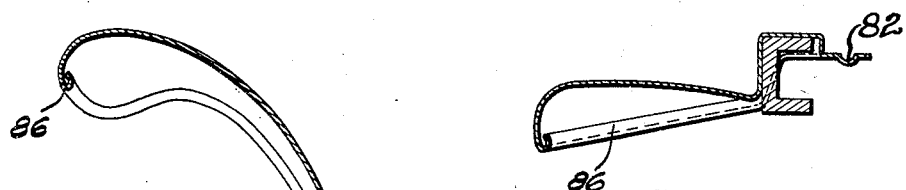
Fig. 3 shows a sectional view of a front fender attached to the chassis.
Figure 4:
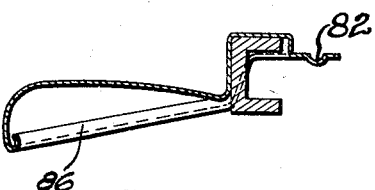
Fig. 4 shows a sectional view of a fender taken substantially on the line 4—4 of Fig. 1.
Figure 9:
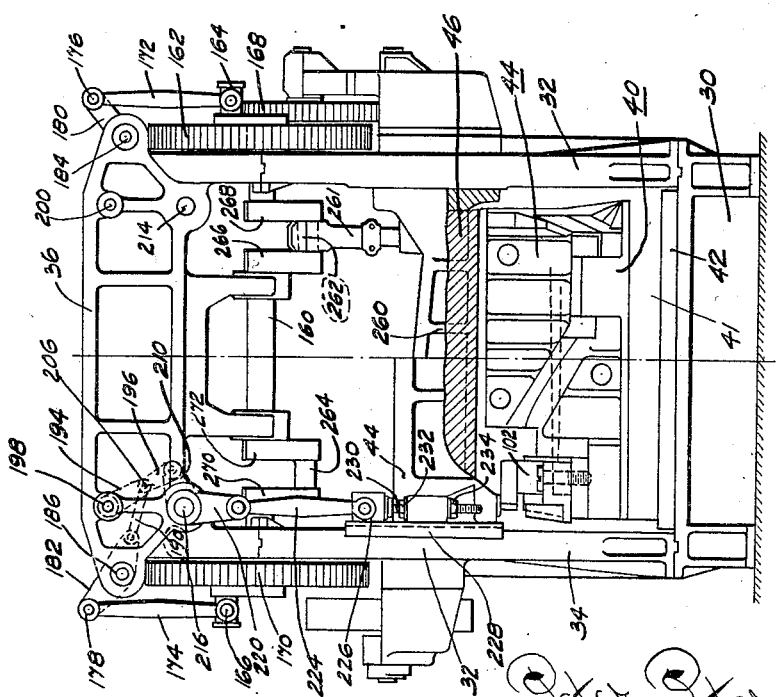

Fig. 9 discloses the press having the clamping members and the forming members for forming the fenders disclosed in Fig. 2 in the closed position.

Figure 10:
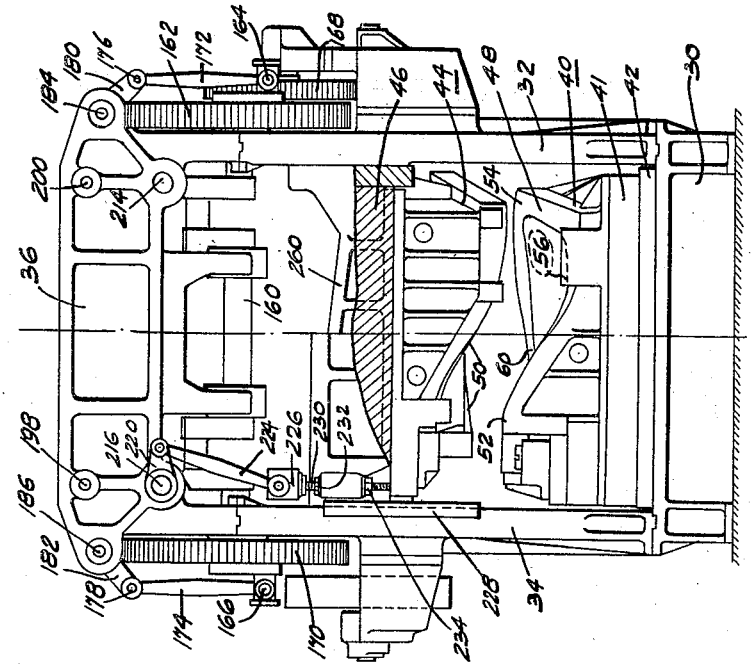

Fig. 10 is a view similar to Fig. 9 showing the clamping members and the forming members in the open position.

Fig. 11 is an enlarged detailed view of the clamping members and the forming members in the closed position.

Fig. 12 is an end elevation of the clamping members and the forming members in closed position looking in the direction of the arrow 12 in Fig. 11.

Fig. 13 is a sectional view taken on line 13—13 of Fig. 11.

Fig. 14 is a fragmentary sectional view taken on line 14—14 of Fig. 12.

Fig. 15 is a plan view of the lower clamping member showing the movable clamping members in the home position.

Fig. 16 is a fragmentary plan view showing the movable clamping member in the tilted position.

Fig. 17 is a front elevation of the lower clamping member shown in Fig. 15.

Fig. 18 is an end elevation looking in the direction of arrow 18 in Fig. 17.

Fig. 19 is a front elevation of the upper clamping member.

Fig. 20 is an end elevation of the upper clamping member looking in the direction of arrow 20 in Fig. 19.

Fig. 21 is a view of the lower clamping member looking in the direction of the arrow 21 in Fig. 19 with the movable clamping member in the home position.

Fig. 22 is a fragmentary sectional view taken on line 22—22 of Fig. 21.

Fig. 23 is a fragmentary sectional view taken on line 23—23 of Fig. 19.

Fig. 24 is a sectional view taken substantially on line 24—24 of Fig. 14.

Fig. 25 is a fragmentary sectional view taken substantially on line 25—25 of Fig. 14.

Fig. 26 is a fragmentary sectional view taken substantially on the line 26—26 of Fig. 15 and a corresponding fragmentary view of the upper clamping member.

Fig. 27 is a plain view of the movable forming member.

Fig. 28 is a front elevation of the forming member disclosed in Fig. 27.

Fig. 29 is an end elevation of the forming member disclosed in Figs. 27 and 28.

The reference character 30 as best seen in Figs. 9 and 10 indicates the base of a punch-press that includes the standards 32 and 34 spanned by a bridging member 36. The press is used in forming sheet metal, such as fenders and other parts for motor vehicles, wherein the blank is gripped intermediate a pair of laterally fixed clamping members that engage a greater portion of the periphery of the blank, the remainder of the periphery of the blank being gripped by a pair of movable clamping members that pulls a portion of the material out of the forming dies during the forming operation as will appear more fully later.

Member 40 suitably attached to the base 30 through plates 41 and 42 forms the lower fixed clamping member that co-operates with the upper laterally fixed clamping member 44 carried by the reciprocating cross-head 46 actuated by a driving mechanism to be described later.

The lower clamping member 40 is provided with a work engaging surface 48 that co-operates with a work engaging surface 50 on the upper clamping member 44 so as to grip the blank inserted intermediate surfaces 48 and 50 when the press is in the open position as disclosed in Fig. 10. As can be clearly seen in Figs. 10 and 11 the work engaging surfaces 48 and 50 do not lie within a plane but have an irregular contour so that the surface 48 has a crest at 52 and 54 joined by a valley 56 and a second valley 60 and a corresponding contour in the upper clamping surface 50.

As the sheet material from which a blank is formed is flat, the clamping members 40 and 44 preform the sheet material so that the periphery is bent out of a single plane when the clamping members 40 and 44 are brought together as disclosed in Fig. 9. Clamping the sheet material intermediate two flat surfaces requires a tremendous clamping force in order to hold the material so that it does not slip especially when heavy sheet material is formed into fenders.

In order to reduce the clamping force the upper clamping member 44 is provided with a recess 70 in which there is permanently seated a rectangular bead 72 that forces a portion of the blank sheet material into slot 74 located in the lower clamping member 40 so as to bite the material thereby preventing slippage as best seen in Fig. 26. The rectangular bead is not continuous throughout the periphery of the fender for the reason that in some places it is desirable to permit material to be drawn into the dies during the forming operation.

An auxiliary bead 76 located parallel to the bead 72 assists this bead in gripping the material where the force tending to pull the material inwardly is the greatest or wherever it is desirable to permit no slippage whatsoever. The auxiliary bead 76 is located in a rectangular slot 78 found in the upper clamping member 44 and extends into the slot 80 registering therewith in the lower clamping member 40. The beads 72 and 76 form ribs 82 and 84 in the fender. These ribs are preferably located so that after the blanks are trimmed the ribs 82 may be used as beads 86 in the finished product, said beads reinforcing the outer periphery of the fenders as is well known to those skilled in the art.

*Laterally movable clamping members*

Figure 1:
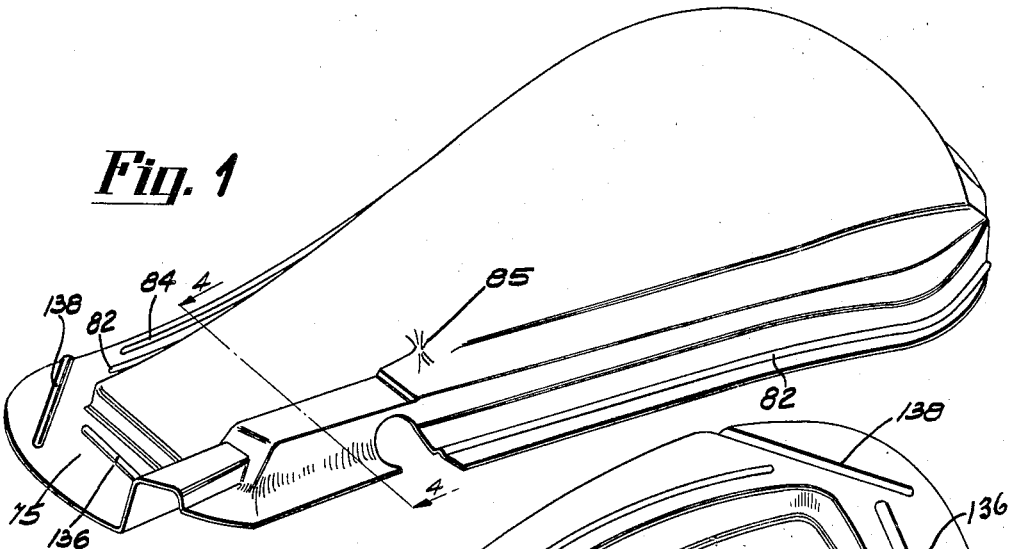

During the crowning or forming operation of the fender there is a tendency to form wrinkles as shown at 85 in Fig. 1 by the old process used before my invention. These wrinkles undoubtedly are formed by the material flowing towards 85 during the crowning of the fender by the dies to be described later. In the fenders thus formed it was necessary either to manually hammer the wrinkles out of the fenders or to fill the wrinkles with solder, or to remove a portion of the metal so as to cut the wrinkles out by means of a torch and then weld a piece into the fender each of which is expensive and increases the cost of manufacturing the fender and each of which tends to weaken the fender, so that in usage there is a tendency for the fender to crack where the wrinkles have been formed.

This has been overcome in this invention by providing a pair of laterally movable clamping members that supply a tension to the sheet material so as to withdraw a portion of the sheet material during the forming operation. By removing a portion of the material no wrinkles are formed so that the contour of the fender at 85 as well as elsewhere is smooth and no undesirable wrinkles are formed.

A clamp carriage 90 is pivotally attached to the lower fixed clamping member 40 by a pivot 92 passing through an aperture 94 in carriage 90 and through an aperture 96 in member 40 and held therein by a nut 98 located in a suitable recess 100 in the lower clamping member 40. Nut 98 is locked in position by a screw 99. A movable clamping member 102, having an inclined clamping surface 104 is rigidly attached to the pivotally mounted carriage 90 by the screws 106 and 108 threadedly engaging 102.

A clamp driven carriage 110 is pivotally attached to the upper fixed clamping member 44 by a pin 112 passing through the aperture 114 in member 44 and the aperture 116 in 110 and held in position by a nut 118 engaging a reduced portion 120 of the pin 112. The nut 118 is split and clamped upon the reduced portion 120 by a screw 121, as best seen in Fig. 21.

An upper laterally movable clamping member 122 is rigidly attached to carriage 110 by suitable screws 123. As may be seen in Fig. 14 the upper clamping member 122 is provided with a rectangular recess 130 carrying a bead 132 that co-operates with a recess 134 in lower clamping member 102 to bite the sheet material 75 along the rib 136 formed therein, and a like bead not shown to bite the sheet material at 138.

The upper clamping member 122 is provided with a cam service 140 which co-operates with a cam 142 which will be described later. As may be clearly seen in Fig. 14, members 90, 102, 110, and 122 are seated intermediate ledges 150 and 152 formed integral with the lower clamping member 40 and the upper clamping member 44 respectively, so that as the upper clamping member is lowered from the position disclosed in Fig. 10 to the down position disclosed in Fig. 9, members 122 and 102 are also advanced toward one another so as to positively grip the material 75.

As best seen in Fig. 13, ledge 150 has suitably attached thereto an L-shaped guide member 154, provided with a notch 155 that receives a shoulder or flange 156 integral with carriage 90 so as to guide the free end of this member and so as to prevent carriage 90 from following the upper clamping member 122 when the clamping members 40 and 44 are separated. Likewise an L-shaped guide member 157 is fixedly attached to the ledge 152 and cooperates with a shoulder 158 integral with carriage 110 to guide and support this carriage and its clamping member 122.

*Driving mechanism for clamping the sheet material*

Journalled in the standards 32 and 34 is a crank shaft 160 that carries suitable driving gears 162 which will not be described in detail for the reason that the driving mechanism does not form a part of this invention. A pair of eccentric crank pins 164 and 166 are carried by the disks 168 and 170 rigidly attached to the ends of the crankshafts 160. A pair of links 172 and 174 pivotally carried by pins 164 and 166 respectively are pivotally attached at 176 and 178 to the rocker arms 180 and 182 respectively each of which are pivotally mounted at 184 and 186 to the spanning bridge 36. Links 190 only one of which has been shown connects the rocker arms 180 and 182 respectively to the toggle mechanisms that includes members 194 only one of which has been shown, having one end pivotally mounted at 198 and 200 respectively to the bridge spanning mechanism 36 and the other end 202 to the other link members 206 only one of which has been shown that are pivotally attached to the cranks 210, only one of which has been shown, that are rigidly carried by the shafts 214 and 216 each of which passes through spanning bridge 36. A pair of crank arms 220, only one of which has been shown, keyed to the shafts 214 and 216 respectively are connected to pitments 224 only one of which is shown pivotally attached to the guide member 226 reciprocatingly mounted in the guide 228 carried by the standards 32 and 34. The upper clamping member 44 is attached to the guiding member 226 by a screw threaded rod 230 fixedly attached to 226 and adjustably attached to 44 by the nuts 232 and 234. It can readily be seen that the upper die member 44 may be properly aligned by adjusting the nuts 234 and 232 on the rods 230. For heavy work four link members 224 and their co-operating parts may be used so that the four corners of the upper clamping member may be supported. From the foregoing description it may be readily seen that as the crank shaft 160 is rotated through one revolution the upper clamping member 44 will be lowered from the up position to the down position so as to grip and form the periphery of a piece of sheet material inserted between the upper and the lower clamping members when the upper clamping member 44 is in the down position and to raise the upper clamping member to the up position as disclosed in Fig. 10. When the clamping member 44 is in the down position and co-operates with clamping member 40 to grip a piece of sheet material, a pair of forming members now to be described are actuated to form or crown the sheet material gripped by the clamping members.

*Forming dies*

A lower matrix or forming die 250 may be inserted in the opening 252 enclosed by the lower clamping member 40 and the movable clamp 102. The matrix 250 is held in position with respect to member 40 by bolts 253. This matrix 250 has a suitable contour so that as an upper forming member or die 254 is lowered as will be more fully described later, the sheet material 75 gripped by the fixed clamping members 40 and 44 is formed. The upper die member 254 is located in the opening 256 bounded by the inner periphery of the upper clamping member 44 and the movable clamping member 122 pivotally carried by member 44. The upper forming die 254, members 255 and 257 held in a relative position by bolts 259, is rigidly attached to a ram 260 actuated by links 261 carried by a pair of crank shafts 262 and 264 actuated by the crank arms 266, 268, 270 and 272 fixedly attached to the crank shaft 160. From this it can be readily seen that as the crank shaft 160 is rotated one revolution the upper forming die 254 is actuated from the up position disclosed in Fig. 10 to the down position disclosed in Fig. 9 and then returned to the up position disclosed in Fig. 10. From this it may be readily seen that as the upper clamping member is advanced from the up position to the down position the forming member 254 will be advanced from the up position to the down position so as to form the blank that is gripped by the clamping members. In order to remove surplus material from the die so as to eliminate the wrinkles 80, the movable clamping members 102 and 122 are actuated about the pivots 92 and 112 respectively by a mechanism now to be described.

*Driving mechanism for oscillating the pivotally mounted clamping members during the forming operation*

As may best be seen in Figs. 13, 15, 17 and 18, the upper forming die 254 is provided with a cam 142 attached to the upper forming member 254 by the screws 300 and 302. As the upper forming member 254 is advanced from the up position to the down position as disclosed in Figs. 9 and 10 the cam surface 304 engages the cam surface 140 of the upper clamping member 122 so as to move the upper clamping member 122 outwardly about the pivot 112. As member 122 oscillates about member 112, clamping member 122 actuates the lower clamping member 102 about its pivot 92, for the reason that 122 engages the flange 306 of member 90, fixedly attached to member 102 as best seen in Fig. 14. From this construction it readily appears that as the forming member 254 advances from the up position to the down position the pivotally mounted movable clamping members 122 and 102 will exert a tension upon the material clamped between these members so as to pull a portion of the material away from the forming dies during the forming operation thereby preventing the material from forming wrinkles.

In Fig. 25 the cam 142 has rotated the upper clamping member 122 and its support 110 about the pivot 112. Likewise Fig. 24 shows the lower clamping member 102 and its support 90 in the out position.

A helical spring 310 interposed between lock nuts 312 carried by a bolt or pin 314 carried by the upper clamping member 44 and an apertured shoulder 316 integral with member 110 returns the upper clamping member 122 and its carriage 110 to the home or in position upon the withdrawal of the forming member 254.

A similar helical spring 320 mounted on a bolt or pin 322 carried by the lower clamping member 40 and interposed between the lock nuts 324 and the apertured shoulder 326 integral with the lower carriage 90 returns the lower clamping member 102 and its carriage 90 to the home position after the withdrawal of the forming member 254 and after the formed fender is removed from the recess 134.

As best seen in Figs. 20 and 24 the upper and lower clamping members 40 and 44 are provided with depending lugs or guides 340, 350 and 354 that co-operate with a shoulder 344 on member 40, channel 352 in the upper clamping member 44, and the outer surface of member 40, respectively, to properly guide the upper clamping member 44 when it advances towards the lower clamping member 40. Thus the beads 72, 76 and 132 are caused to register with the slots or grooves 74, 80 and 134 to form the ribs 82 and 84 in the fender.

*Operation*

From the foregoing description it is seen that upon the insertion of a suitable flat blank of sheet material between the upper and lower clamping members 40 and 44 the blank is preformed and gripped by the clamping members as these are brought together. In order to prevent slippage and so as to form ribs 82 and 84 in the blank the sheet material is forced into slots 74, 80 and 134. After the sheet material is thus gripped the upper forming member advances toward the matrix 252 located within the confines of the lower clamping member 40 so as to form or crown the fender. As forming member or die 254 advances towards the work piece or blank the clamping members 102 and 122 together with their carriages 90 and 110 move away from the clamping members 40 and 44 so as to put the blank in tension thereby removing excess material from the forming members during the forming operation. This prevents the material from wrinkling when being formed so that the formed article may be found in a plurality of planes adjacent one point as for example, adjacent to point 82.

As the inclined surface 304 of the cam 142 engages the inclined surface 140 of the clamping member 122 a force is applied that moves these clamping members 102 and 122 away from the die 254 and another force in the direction of movement of the cam 142 that tends to more tightly clamp the blank 75 between the movable clamping members 102 and 122.

In places it may be desirable to permit slippage so as to supply additional material during the forming operation. As already described this may be accomplished by leaving portions of the periphery without a bead or rib.

Upon the removal of the forming member or die 254 the upper clamping member 122 and its carriage 110 is restored to home position by the spring 310. Upon the removal of the blank from the lower clamping member 40 the lower movable clamping member 102 and its carriage 90 is returned to the home position by spring 320. The blank thus formed into a fender blank is then trimmed and where desired beaded by turning the ribs 82 or 84.

It is to be noted that the die forming and the stretching elements are operable differentially; that is to say while the stretching member for withdrawing excess material from the area of minimum draw is actuated by the movement of the forming ram through interengaging cam faces, the movement of the respective elements is not at the same speed nor through the same range of travel and in the present instance is not in the same direction. The forming ram and the excess material take up thus move differentially, one having movement relative to the other, as distinguished from a single unitary ram having integrally fixed portions.

Instead of forming a single fender a pair of fenders may be formed by providing a pair of sets of clamping and forming members adjacent each other and mounted on the same press. A fender thus formed is disclosed in Figs. 5 to 8 inclusive. The apparatus for forming the double fender has not been disclosed for the reason that this is merely a modification of the forming apparatus disclosed.

Within the purview of this invention any other suitable article may be formed in a suitable apparatus wherein excess material is withdrawn from the forming dies during the forming operation. Instead of having the movable clamping members mounted for oscillatory movement these may be mounted for longitudinal movement or any other suitable movement. Several movable clamping members may be used around the periphery so as to remove material in different sections of the blank and in different directions during the forming operation. Likewise clamping members may be mounted to move toward the clamping members so as to add a predetermined amount of material during the forming operation when this is found necessary.

While the form of embodiment of the present invention as herein disclosed, constitutes a preferred form, it is to be understood that other forms might be adopted, all coming within the scope of the claims which follow.

What is claimed is as follows:

1. In a machine for forming sheet metal, the combination of a device for forming sheet metal, with a pair of clamping members surrounding a portion of said forming device for clamping a portion of the periphery of the blank, a second pair of clamping members, said second pair of clamping members being movably mounted, said second pair of clamping members gripping another portion of the periphery of the blank, and driving means responsive to the movement of the forming device for actuating said second pair of clamping members during the forming operation so as to cause said second clamping members to have a movement relative to said forming device.

2. In a machine for forming sheet metal the combination of a pair of members for forming sheet metal, one of the said forming members having relative movement with respect to the other, means for clamping a portion of the sheet metal during the forming operation and means for clamping another portion of the sheet metal during the forming operation, said second means being movably mounted, and cam means attached to the moving member of the forming device for actuating said second means during the forming operation so as to change the position of the sheet metal.

3. In a forming machine for forming a sheet metal blank, the combination of a device for forming sheet metal with a pair of clamping members for gripping a portion of the sheet metal, a second pair of clamping members for rigidly gripping another portion of the sheet metal and movably mounted for withdrawing a portion of the material during the forming operation and means for moving said second clamping members away from the forming device during the forming operation so as to cause some of the metal to flow out of said device.

4. In a forming machine for forming sheet metal, the combination of a device for forming sheet metal with a pair of stationary clamping members for gripping a portion of the sheet metal, a pair of movable clamping members for gripping another portion of the sheet metal and means for moving the movable clamping members away from the forming device and for tightening the movable clamping members during the forming operation so as to pull a portion of the sheet metal from the forming device.

5. The method of making an article from a sheet metal blank, including holding a portion of the periphery of the blank, forming the blank thus held and shifting another portion of the periphery of the sheet metal during the forming operation so as to form an article having a smooth surface.

6. The method of making articles of sheet metal comprising the steps of forming the sheet metal by drawing, supplying additional sheet metal during the forming operation in one area and removing sheet metal in other areas during the forming operation so as to form an article having a smooth surface.

7. In a forming machine for forming a sheet metal fender from a blank, the combination of a die for forming the sheet metal blank with a pair of clamping members having a fixed position when in engagement with the material, and a pair of clamping members movably mounted when in engagement with the material for shifting the material in the die during the forming operation, and actuating means for moving said second pair of clamping members relative to the first mentioned pair thereof during the forming operation.

8. In a sheet metal forming apparatus, pressure forming means for shaping a sheet metal blank, blank engaging means including relatively movable portions one of which permits drawal of material into the forming pressure area and the other of which effects withdrawal of material from the forming pressure area, and actuating means for the pressure forming means and cam means for actuating one portion of the blank engaging means relative to the other.

9. In a sheet metal forming apparatus, pressure forming means for shaping a sheet metal blank, blank holder means for the blank to be shaped, said blank holder means being expansible while in engagement with the blank and during operation of the pressure forming means thereby subjecting the blank to stretching tension additional to the pressure of the forming means, actuating means for the pressure forming means and means other than the pressure forming means for simultaneously expanding the blank holder means.

10. In a sheet metal forming apparatus, pressure forming means for a sheet metal blank, blank holder means for a blank to be shaped, said blank holder means being of variable shape and actuating means for changing the shape of at least a portion of the blank holder means while in engagement with the blank and during operation of the forming pressure means, and simultaneously therewith.

11. In a sheet metal forming apparatus, pressure forming means for shaping a sheet metal blank, blank holder means against the resistance of which material is drawn into one portion of the shaped area of the blank, and retracting means for another portion of the blank movable differentially relative to the pressure forming means, and acting in unison with the forming means to withdraw surplus material from the shaped area during the forming operation.

12. In a sheet metal forming apparatus, pressure forming means for a sheet metal blank, sectional blank holding means engaging a blank to be formed, and means for actuating a portion of the blank holding means away from the pressure forming means independently of other portions of the blank holding means during the forming operation to effect withdrawal of surplus material from the formed area.

13. The herein described method of forming sheet metal articles, including subjecting a sheet metal blank to the forming action of a contoured die and inducing unbalanced movement of different areas of the blank simultaneously into and out of the die to afford a shape from which surplus material and wrinkles are eliminated.

14. The herein described method of forming sheet metal articles including subjecting a blank to forming pressure and simultaneously tensioning the blank in opposition to the forming pressure by subjecting the blank to unbalanced pulling action in different directions so as to withdraw surplus material from the area thereof within which the article is being formed.

15. The herein described method of forming sheet metal articles including subjecting a sheet metal blank to forming pressure over a substantial area thereof and simultaneously subjecting the blank to stretching tension along certain portions of said area additional to said forming pressure so as to withdraw surplus material from the formed area whereby possible wrinkles are avoided.

16. The herein described method of forming sheet metal articles including subjecting different parts of a sheet metal blank to simultaneous unbalanced pushing and pulling action substantially into agreement with a contoured form, the pulling action withdrawing surplus material from the contoured area of the blank whereby possible wrinkles are avoided.

17. In a sheet metal forming apparatus, a movable forming member for shaping a sheet metal article under pressure, a sectional blank holder for a sheet metal blank from which the article is to be formed, a portion of which blank holder is movable relative to the remainder thereof, and an operative means additional to the movable forming member for moving the movable portion of the blank holder in a direction to exert a pulling strain on the blank contrary to that induced by the pressure of the forming member to withdraw surplus material from the field of operation.

18. In a sheet metal forming apparatus, a movable forming member for shaping a sheet metal sheet under pressure, an expansible blank holder for a sheet metal blank from which the article is to be formed, and operating means additional to the forming member for expanding the blank holder in unison with the operative movement of the forming member for withdrawing surplus material from the field of operation of the forming member.

19. The method of forming sheet metal articles under forming pressure including the step of increasing the tension upon a portion of the material beyond that imposed by the forming pressure to effect unbalanced drawing of the material and thereby prevent accumulation of surplus material in the form of wrinkles.

20. The method of forming sheet metal articles by the application to a sheet metal blank of deforming pressure including the step of subjecting the blank to ununiform tension to a degree in excess of that imposed by the deforming pressure to effect unbalanced drawing of the material and thereby prevent accumulation of surplus material in the form of wrinkles.

21. The method of die stamping large irregularly shaped sheet metal articles by subjecting a blank to different drawing pressure within different areas thereof which includes transversely substantially stretching the metal of the blank in the plane of the blank, in the area of minimum draw and deeply die drawing it while so stretched in a direction at substantially right angles to the blank.

22. The method of die stamping large sheet metal articles of irregular form requiring extensive and slight drawing operations in different areas thereof which comprises the step of subjecting a blank to ununiformly distributed forming pressure and withdrawing excess metal from the region of minimum draw differentially with the drawing operation while completely die forming the article thereby avoiding the formation of wrinkles or creases in the region of the minimum draw.

23. The method of die stamping large sheet metal articles of irregular form requiring extensive and slight drawing operations in different areas thereof, including the step of subjecting a blank to different drawing pressure within different areas thereof and simultaneously auxiliarly withdrawing excess metal from the region of lesser draw while making the main draw thereby avoiding the formation of wrinkles or creases in the metal in the final draw.

24. The method of die stamping large irregularly shaped sheet metal articles comprising the steps of holding the blank around its peripheral portion and die drawing spaced portions thereof within the peripheral portion while substantially stretching the metal transversely of the blank between said spaced portions to withdraw the excess metal in that region and form a smooth article.

25. The method of die stamping large irregularly shaped sheet metal articles by subjecting the blank to extensive and lesser drawing operations in different areas thereof including the steps of holding the blank around its peripheral portion and die drawing it to shape and form intermediate its peripheral portion in a direction generally perpendicular to the plane of the blank, and substantially stretching the metal of the blank transversely in the regions of excess metal to remove all wrinkles and irregularities during the final die drawing operation.

26. A method of die drawing sheet metal fenders comprising generally an S-formed curvature and a flat portion intersecting the S-form portion in horizontal section, comprising the steps of holding the peripheral portion of the blank, die drawing the opposite ends of the blank to form the S curvature, and transversely substantially stretching the metal of the blank to remove excess metal from the intermediate region where the flat portion intersects the S-form portion.

27. Apparatus for die stamping large irregularly shaped sheet metal articles comprising means for clamping the edges of a blank, means for substantially stretching the blank transversely in the plane of the blank when so clamped and means for die drawing the blank when so stretched movable generally perpendicularly to the plane of the blank, the stretching means and die drawing means being differentially movable during the forming operation.

28. Apparatus for die drawing sheet metal articles of irregular form which consists of a bed having surfaces upon which the peripheral margins of the blank are adapted to rest, means coacting with said surfaces to clamp the margins in place, a die movable generally perpendicularly to the sheet for drawing and shaping it, and a stretching member movable with respect to said die to substantially stretch the metal of the blank transversely in certain areas thereof to remove excess metal prior to the final drawing of the blank to the required form.

29. Apparatus for die drawing sheet metal fenders by subjecting a blank to greater and lesser degrees of draw in different portions thereof including clamping means for holding the peripheral portions of a blank, a punch movable within said clamping means generally perpendicularly to the plane of the blank to form the same, and a gripper actuated during the movement of said punch for engaging a peripheral portion of the blank and thereby substantially stretching the metal of the blank transversely within the region of minimum draw prior to the final drawing movement of the punch.

30. Apparatus for die drawing sheet metal articles of irregular form by subjecting a blank to different degrees of draw in different areas thereof which includes lateral hold down surfaces, a hold down member gripping the metal of a blank between it and said surfaces and leaving a central portion free to be drawn, a movable drawing member movable into engagement with the sheet to form it, and a stretching member movable differentially with the drawing member to substantially stretch the blank in the region of minimum draw engaged by means associated with the drawing member prior to the final drawing movement of the drawing member for moving the stretching members relative to the drawing member.

31. Apparatus for die drawing large irregularly formed articles from a flat sheet at one stroke of the apparatus by subjecting a blank to different degrees of draw in different areas thereof including holding means for clamping the peripheral portion of the blank, a plunger for drawing the metal of the blank in one direction to the maximum depth of draw, a laterally movable gripper cooperating with the plunger for drawing the metal from a region of minimum draw simultaneously with the drawing operation of the plunger to remove excess metal from said region of minimum draw and prevent the formation of wrinkles during the final stroke of the apparatus, and means for operating said parts in properly synchronized relation.

PETER PETERSON.

CERTIFICATE OF CORRECTION.

Patent No. 2,002,097.  May 21, 1935.

PETER PETERSON.

It is hereby certified that error appears in the printed specification of the above numbered patent requiring correction as follows: Page 6, first column, line 35, claim 18, for "sheet" read article; and that said Letters Patent should be read with this correction therein that the same may conform to the record of the case in the Patent Office.

Signed and sealed this 25th day of June, A. D. 1935.

Bryan M. Battey (Seal)   Acting Commissioner of Patents.